United States Patent [19]
Maenicke

[11] 3,735,204
[45] May 22, 1973

[54] CIRCUIT ARRANGEMENT FOR DETERMINING THE DISTANCE OF FAULT LOCATIONS IN LINE SHORT-CIRCUITS

[75] Inventor: Eckart Maenicke, Berlin, Germany

[73] Assignee: Siemens Aktiengesellschaft, Berlin, Germany

[22] Filed: June 25, 1971

[21] Appl. No.: 156,733

[30] Foreign Application Priority Data

June 26, 1970 Germany.................P 20 32 578.4

[52] U.S. Cl. .............................317/27 R, 317/36 D
[51] Int. Cl. ................................................H02l 3/28
[58] Field of Search ..................317/36 D, 27 R

[56] References Cited
UNITED STATES PATENTS 3,303,390  2/1967  Sonnemann ..................317/36 D
3,312,865  4/1967  Gambale ......................317/36 D
3,369,156  2/1968  Sovillard......................317/36 D Primary Examiner—James D. Trammell
Attorney—Curt M. Avery, Arthur E. Wilfond, Herbert L. Lerner et al.

[57] ABSTRACT

In a circuit arrangement for determining the distance of the fault location during short-circuits on a line, an analog measuring data transmitter used for obtaining a direct voltage which is proportional to the line voltage and another analog measuring data transmitter which is influenced by the line current used to obtain another DC voltage proportional to the line current, are connected to the input of a voltage-frequency converter connected to a device for digital division or quotient formation. The device has a control circuit which, upon the occurrence of a short-circuit, initiates the measurement or determination of the distance of the fault location, in response to an initiating signal.

17 Claims, 4 Drawing Figures

Patented May 22, 1973 3,735,204

CIRCUIT ARRANGEMENT FOR DETERMINING THE DISTANCE OF FAULT LOCATIONS IN LINE SHORT-CIRCUITS

DESCRIPTION OF THE INVENTION

The invention relates to a circuit arrangement for determining the distance of fault locations during line short-circuits.

In a known circuit arrangement of this type, a capacitor is charged to the peak value of a measuring voltage proportional to the voltage occurring on the line during short-circuits, within the time available between the short-circuit and the disconnection of the line. During the same time, a second capacitor is charged to a measuring voltage proportional to the current which occurs during short-circuits. The voltage conditions in the charging currents of both capacitors are selected so that the voltage at the second capacitor is higher than the voltage at the first capacitor if the fault location is situated within the line portion being monitored. After the disconnection of the charging circuits, the capacitor which is charged to the current-proportional voltage is discharged up to the same voltage with the voltage at the capacitor whose charge is proportional to the line voltage. The time interval which elapses thereby serves as a measure or determination of the distance of the fault location.

The invention takes a different direction in order to obtain the following advantages for a circuit arrangement used to measure or determine the distance of the fault location during short-circuits occurring on the line. In accordance with the invention, an analog measuring data transmitter influenced by line voltage is used to provide a DC voltage proportional to the line voltage. Another measuring data transmitter influenced by line current is used to provide another DC voltage proportional to the line current. The outputs of the transmitters are connected to a voltage-frequency converter which is connected to a device for digital division or quotient forming. The arrangement is provided with a control circuit which, when a short-circuit appears, initiates in response to an initiating signal, the measurement or determination of the fault location.

The circuit arrangement of the invention is particularly preferred when one of the analog measuring data transmitters is also influenced by the line current and delivers, as a transmitter of reactive voltage, a direct voltage proportional to the reactive voltage. In such a circuit arrangement, undesired influences upon the measuring result caused by the light arc resistance are excluded. In the known circuit arrangements for determining the distance of the fault locations during short-circuits along the line, however, this leads to an impairment of the measuring accuracy. Basically, the analog measuring data transmitters comprise rectifier devices.

Furthermore, it is preferable, in order to increase the measuring accuracy of the circuit arrangement of the invention, if at least the other analog measuring data transmitter, as described in the German Published Application No. 1,268,730, is provided at the input with a known circuit device having two resistors for the purpose of removing the volatile components from the measured quantity it receives in proportion to the line current. One of the resistors is energized with the electrical measurand or measured quantity in a circuit, via a filter network which suppresses the stationary component, so that a voltage which occurs at said resistor corresponds to the volatile component. The other resistor is energized without an intermediate filter circuit, by the electrical measured quantity in another circuit, so that the voltage occurring at said resistor corresponds to the electrical measured quantity. Both voltages for obtaining the stationary components are connected in opposition. This increases the fault distance in a preferred manner.

The device for digital division or quotient forming of the circuit arrangement of the invention may be designed in different ways. Thus, the arrangement may contain a single counter connected to one of the voltage-frequency converters which is controlled in synchronism by the other voltage-frequency converter. This preconditions the other voltage-frequency converter so that it may be "realized" in the then lower frequency range at a negligible response time.

Another embodiment of the device for digital division or quotient forming is provided with two counters. One of the counters is connected to a voltage-frequency converter. The one counter which is connected to the one voltage-frequency converter is controlled in synchronism by the other counter connected to the other voltage-frequency converter. The other counter effects a frequency division, with the division factor or divisor being selected from a technical and economical viewpoint.

One would endeavor, for example, to select the division factor or dividend in such a manner that the same systems may be used for both voltage-frequency converters. "Simatic N structural groups" of Siemens AG may be used as voltage-frequency converters. See copending patent application Ser. No. 71,589 filed Sept. 11, 1970, for "Remote Protection Apparatus Having A Polygonal Tripping Region". The control circuit which, upon the occurrence of a short-circuit, initiates the determination or measurement of the distance of the fault location, preferably comprises logic elements. The control circuit preferably includes a starting device which, when a short-circuit occurs, delivers a start pulse in response to an initiating signal. The start pulse causes the counter to receive the count or register.

The control circuit of the circuit arrangement of the invention preferably has a measuring error control device connected to the output of the one counter, for monitoring the deviation of the counter positions, counts or registrations of sequential timing periods with respect to whether the deviations are within a prescribed range. When the deviations of the counter positions, counts or registrations are within a prescribed range, the control circuit delivers a control signal. The design of the control circuit of the circuit arrangement of the invention offers the preferred opportunity that, in the event a protective device for the line is connected to the control circuit, the control signal quenches a blocking signal for the release command of the protective device, provided the control signal appears within a predetermined time interval, following the initiating signal of the control circuit. This provides the preferred opportunity to obtain the most accurate measuring result with regard to determining the distance of the fault location, since the available time is utilized to a maximum. It is recognized that circuit arrangements for measuring the distance of the fault location measure or indicate the location of the fault on the line with the best possible exactness. It is also taken into consideration that the protective devices disconnect the line with the fault selectively, and as rapidly as possible. It is realized that in view of these conditions, the circuit arrangement of the invention permits an optimum measuring exactness, with regard to the measurement or determination of the distance of the fault location.

In order that in no case a necessary release and disconnection of the fault-afflicted line be prevented by the circuit arrangement of the invention, which determines the distance of the fault location, it is expedient to quench the blocking signal at the latest, after the lapse of a predetermined time interval, that is, regardless of whether up until such time the distance of the fault location had already been determined with the desired exactness.

In order to provide optimum utilization of the time available for the exact determination of the distance of the fault location, that is, in order to also utilize the time which is available up to the actual closing of the power switches, after the quenching of the blocking signal, it is preferable that after a specifically predetermined period the control circuit deliver a stop pulse for the counters in order to obtain the counter position, count or registration. Such counter position, count or registration then determines the measuring result.

The counter position, count or indication may be read at a digit indicating device connected to the counter output or it may be retained or recorded by a printing device connected to the counter, which prints the measured distance of the fault location. The printing device is preferably released by the control circuit for printing, so that printing cannot be undertaken prior to the availability of a final measured result. The printing may occur automatically or it may be released from the outside.

Since a delay of the protective signal in favor of a slight error cannot always be permitted during fault determination, nor is it desirable, in all cases, in a circuit arrangement of the invention which is provided with a protective device, it is advantageous to design the control circuit so that it may be switched over or reversed by an operating switch, so that the protective device will be effective in one position independently of, and in another position in dependence upon, the determination of the distance of the fault location. Both positions of the operating switch permit indications of whether the measurement or determination of the distance of the fault location was interrupted prior to obtaining the preselected exactness or whether the preselected exactness had been achieved.

To prevent this, it is advisable to use, for example, a remote protection with a polygonal release area such as disclosed in U.S. Pat. application, Ser. No. 71,589 filed Sept. 11, 1970, now U.S. Pat. No. 3,644,788. According to this type of protection, a quadrangular release area is provided with the aid to two comparison resistors which furnish two auxiliary voltages; depending upon the phase position, respective difference voltages are formed from an auxiliary voltage and the measuring voltage. The auxiliary voltages are connected to a logic circuit which issues a releasing signal when the difference voltages have zero passages of a given sign during a time interval derived from the zero passages of the auxiliary voltages or of voltages derived from these auxiliary voltages.

To elucidate the aforedescribed features and in order that the invention may be readily carried into effect, it will now be described with reference to the accompanying drawing, wherein.

Figure 3:
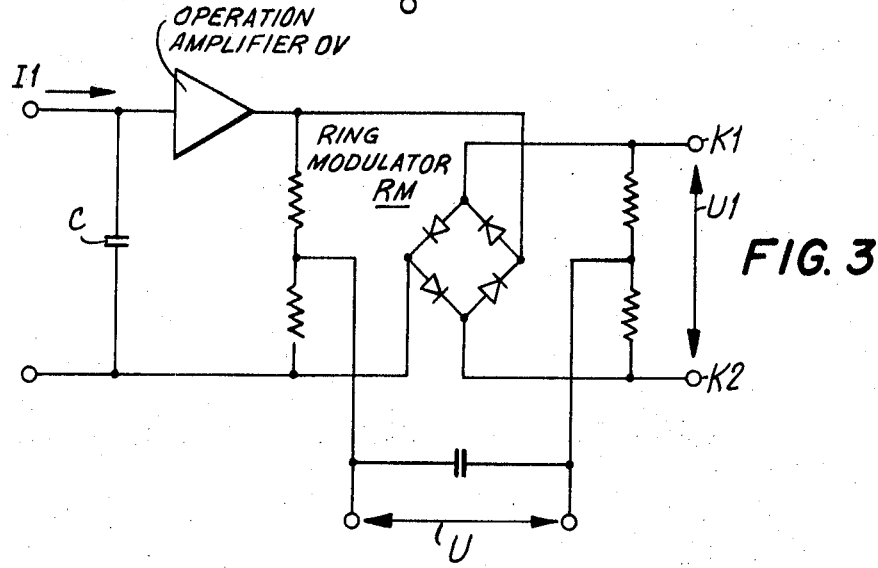
FIG. 3 is a circuit diagram of a reactive voltage transmitter.

The circuit arrangement of the invention comprises on its input side two analog measuring value transmitters G1 and G2. The transmitter G1 receives a voltage U1 proportional to the line voltage and also a current G1 proportional to the line current, so that said transmitter operates as a reactive voltage transmitter. The input of transmitter G1 receives only a current I1 proportional to the line current. The output of transmitter G1 thus provides a direct voltage U2 which is a measure or indication of the reactive voltage, whereas the direct voltage U3 at the output of the transmitter G2 is a measure or indication of the current I1. FIG. 3 shows an embodiment of the reactive voltage transmitter G1.

A voltage-frequency converter SF1 is connected to the transmitter G1 and produces output pulses having a pulse repetition rate or frequency f1. A voltage-frequency converter SF2 is connected to the transmitter G2 and produces output pulses having a pulse repetition rate or frequency f2. The frequency f1 is therefore proportional to the reactive voltage and the frequency f2 is proportional to the line current I1.

Figure 1:
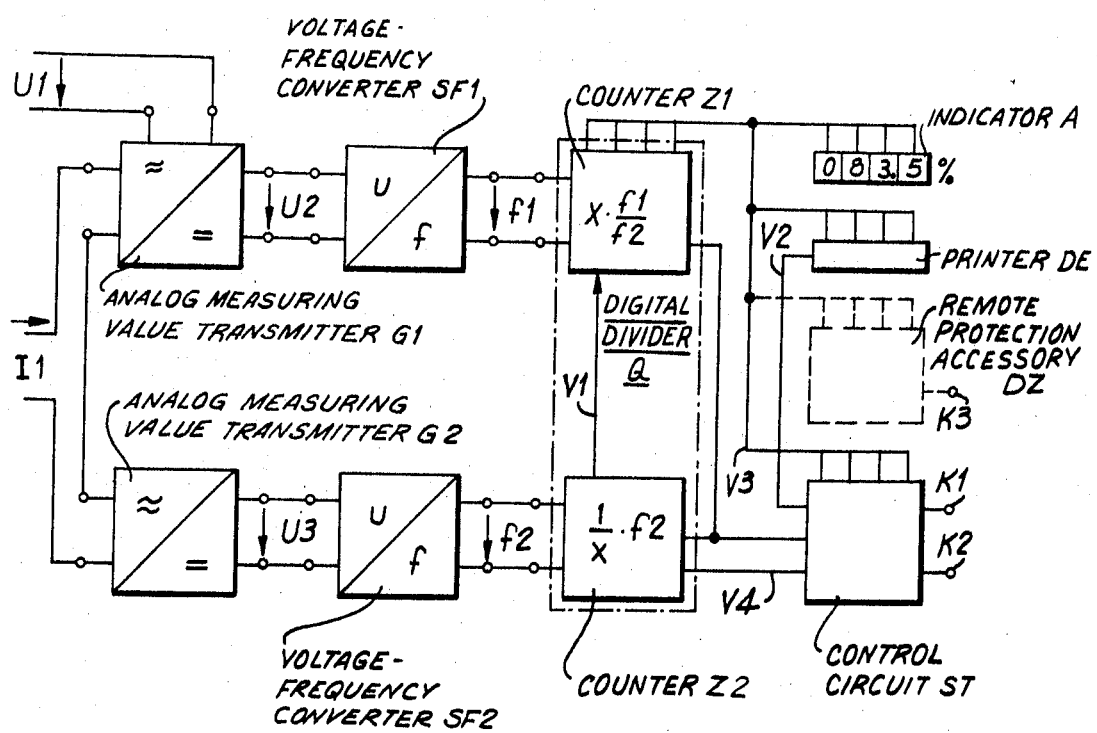
FIG. 1 is a block diagram of an embodiment of the circuit arrangement of the invention with means for remote protection.

The circuit arrangement of the invention, as illustrated in FIG. 1, is provided with a digital divider or arrangement for digital quotient formation Q which comprises two counters Z1 and Z2. The counter Z1 is connected to the voltage-frequency converter SF1 and the counter Z2 is connected to the voltage-frequency converter SF2. The counter Z2 operates as a frequency divider and controls the counter Z1 through a connecting lead V1 by means of clock pulses. Consequently, if the divisor factor is "$x$", the counter Z1 will show a counter state, count, position or registration given by the quotient of f1 and f2, multiplied by the factor $x$.

An indicator or device A which indicates the distance of the fault location in analog form, in percent of the total length of the line, is connected to the counter Z1 in the embodiment of FIG. 1. The counter Z1 and the indicating device A may be designed, for example, as described in a book entitled "Halbleiter-Schaltbeispiele-Integrierte Schaltungen", 1970, pages 36 to 38, issued by Siemens AG. The counter Z2 may consist of the frequency divider described on page 21 of said book.

A conventional printer or printer device DE is connected to the counter Z1. The printer device DE is released to perform a printing operation when the measuring of the fault location distance is completed. The release of the printing operation is effected through a connecting line V2.

A control circuit ST is connected through a connecting line V3 to the counter Z1. The indicating device A and the printer device DE are connected to the same line V3. The control circuit ST is also connected at a terminal K1 to an excitation circuit (not shown in FIG.

1) which, upon the occurrence of a short-circuit, causes a starting device (not shown in FIG. 1) of the control circuit ST to issue a starting pulse. The excitation circuit may essentially consist of an over-current relay (see Titze, "Fehler und Fehlerschutz in elektrischen Anlagen", Volume 2, 1953, page 104) or it may consist of a similarly known underimpedance excitation device. The starting pulse is supplied through another connecting line V4 to the counter Z2 as a "0" pulse, whereafter both counters are set to "0" by a clock pulse from the counter Z2 to the counter Z1 through the connecting line VI. The start pulse further extinguishes the stop signals at both counters so that the counting operation can commence.

In a circuit arrangement for digital dividing or digital quotient formation with only one counter the counter Z2 shown in FIG. 1 is omitted and the output of the voltage-frequency converter SF2 is connected to the counter Z1. Only one connecting line then extends from the control circuit ST to the counter Z1. Otherwise the circuit arrangement with only one counter is the same as the one shown in FIG. 1.

A measuring error checking device of the control circuit ST continuously supervises the counter Z1 for any departures of the counter states of successive clock intervals as to whether the departures are within a predetermined range. For this purpose, the measuring error checking device may comprise a circuit for the comparison of counter states as described, for example, in the book issued by SIEMENS AG and entitled "Halbleiter-Schaltbeispiele — Integrierte Schaltungen", 1970, page 32 and illustrated in FIG. 1.5. The circuit arrangement need only be designed for connection to two counters of which one may be identical to the counter Z1, an additional counter being arranged in the measuring error checking device to operate as a memory in the time interval in which the counter Z1 is cleared and is started for a new measuring operation. The additional counter may be designed like the counter Z1.

When the requirement for a departure within a given range is met, another output K2 of the control circuit ST cancels a blocking signal for an OFF command of a protective device (not shown in FIG. 1) so that the protective device may then cause the disconnection of the faulty line. The non-illustrated protective device, for example, may be designed as described in U.S. Pat. application Ser. No. 71,589, filed Sept. 11, 1970, now U.S. Pat. No. 3,644,788.

The cancellation of the blocking signal constitutes the termination of the given preselectable period of time which is so selected that it will expire reliably before the power breaker coordinated to the protective device will commence to separate its contact members. At the end of this period of time, the stop signal for the counting operation is produced, and the counter indication remains at the state then reached. As soon as this has occurred, the printing operation can be automatically released or a remote release can be effected. This is apparent from FIG. 2, which illustrates a control circuit.

Figure 2:
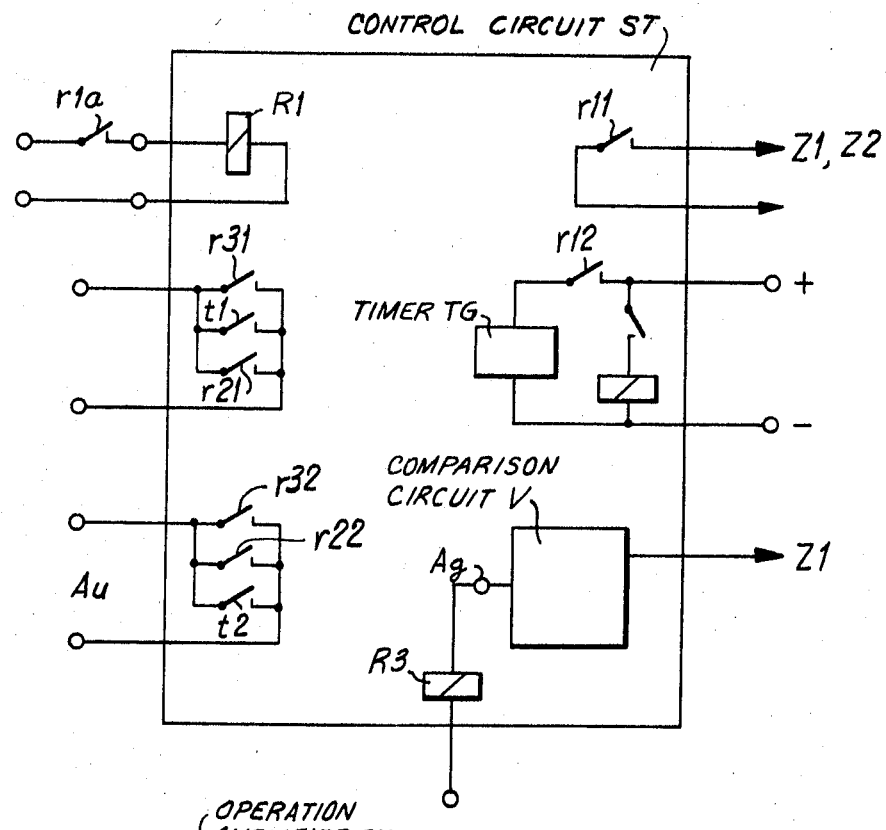
FIG. 2 is a block diagram of an embodiment of a control circuit.

The control circuit ST shown in FIG. 2 comprises a relay R1 which is excited, for example, through a contact r1a of the aforedescribed excitation circuit. The relay R1 has a contact r11 which, when closed, issues a starting pulse to the counters Z1 and Z2 (FIG. 1). Another contact r12 of the relay R1 starts a timer TG which, for example, may be designed as described in the published German patent application No. 1 588 769. At the latest, upon expiration of a timing interval determined by the timer TG and counted from the moment of excitation, the blocking signal for the releasing command of the protective device is cancelled. The contact r12 and the timer TG can be shunted by a type-of-operation selector switch BS in series with a relay R2.

The control circuit ST further comprises a comparison circuit V for the counter states as described in the aforedescribed SIEMENS book "Halbleiter-Schaltungen". An auxiliary relay R3 is connected to the output Ag of the comparison circuit V. The auxiliary relay R3 becomes excited when successive counter states exhibit departures within a predetermined tolerance limit. The relay R3 has a first contact r31 which, when closed, issues a releasing pulse to a remote protection device which may be designed as described in U.S. Pat. application, Ser. No. 71,589, filed Sept. 11, 1970, now U.S. Pat. No. 3,644,788.

A contact t1 of the timer TG is connected in parallel with the contact r31, so that when the contact t1 is actuated there will be a release of the remote control device. A contact r21 of the relay R2 is connected in parallel relation so that the remote protection, if desired, may also respond independently of the arrangement for measuring the distance of a fault location.

The control circuit ST has an output Au which issues a pulse for stopping the counters Z1 and Z2 with the aid of parallel connected contacts r32 of the relay R3, r22 of the relay R2 and t2 of the timer TG. Another pulse from the output Au passes to the printer device DE for actuating said printer device. The relays in the circuit diagram of FIG. 2 are preferably constituted by electronic solid state devices.

If desired, and as indicated in FIG. 1 by broken lines, the circuit arrangement according to the invention may be provided with an accessory DZ for remote protection, which is also connected through the line V3 to the counter Z1. The remote protection accessory DZ comprises for each resistance stage as many number setting means as the numerical indicator A has digital positions. Furthermore, the accessory DZ comprises a timer, an OFF command transmitter and a network composed of known logic components (not shown in FIG. 1). The output K3 of the remote protection accessory is connected to a power breaker (not shown in FIG. 1).

The remote protection accessory DZ converts the illustrated circuit arrangement of the invention to provide for resistance-dependent time staggered protection.

FIG. 3 shows an example of an embodiment of an analog measuring value transmitter G1 which operates as a reactive voltage transmitter. Starting from a multiplier circuit as described in German patent No. 1 293 312, the current I1 is supplied to the multiplier circuit with a ring-modulator RM through a capacitor C (90° phase displacement) and an operation amplifier OV. The output terminals K1 and K2 of the ring modulator RM provide a voltage V which corresponds to the voltage $U1 \sin \phi$, $\phi$ being the phase angle between I1 and U1. This relation is due to the fact that the operation amplifier OV is designed to feed a constant current into the multiplier circuit.

Figure 4:
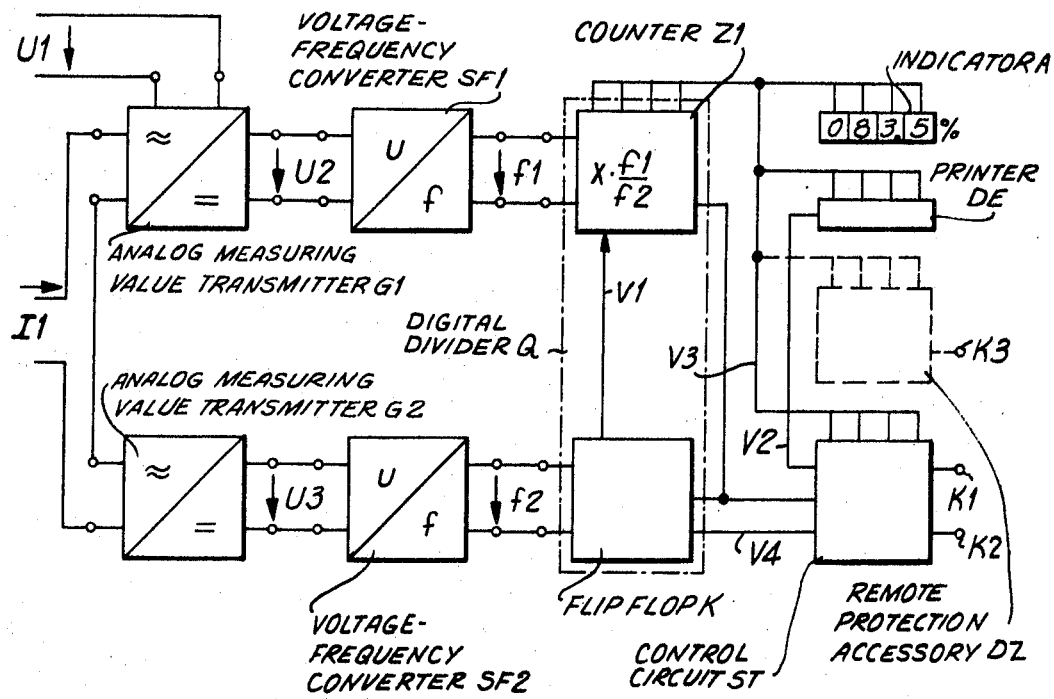
FIG. 4 is a block diagram of another embodiment of the circuit arrangement of the invention having only one counter in the digital divider or digital quotient forming device.

FIG. 4 shows an embodiment of a circuit arrangement of the invention with a single counter Z1 in the circuit portion Q, for digital quotient formation. In lieu of the counter Z2, a bistable flip flop stage K is provided which converts the peaked or needle pulses of the voltage-frequency converter SF2 to the rectangular shape required for controlling the counter Z1. Otherwise, the circuitry of FIG. 4 is the same as that of FIG. 1.

The invention provides a circuit arrangement for measuring the distance of fault locations in the event of short-circuits on lines which, while affording optimal utilization of the time available for fault-distance determination. An accuracy of measuring the fault distance location to an extent not obtainable with the aid of the known circuit arrangements of this general type is provided by the invention.

While the invention has been described by means of a specific example and in a specific embodiment, I do not wish to be limited thereto, for obvious modifications will occur to those skilled in the art without departing from the spirit and scope of the invention.

I claim:

1. A circuit arrangement for measuring the distance of fault locations due to short-circuits on electric lines, comprising a first line voltage responsive analog measuring data transmitter (G1) for providing a first direct voltage (U2) proportional to the line voltage; a second line current responsive analog measuring data transmitter (G2) for providing a second direct voltage (U3) proportional to the line current; a first voltage-frequency converter (SF1) connected to the first analog measuring data transmitter; a second voltage-frequency converter (SF2) connected to the second analog measuring data transmitter; a digital divider (Q) connected to the first and second voltage-frequency converters; and a control system (ST) connected to the digital divider and responsive to an initiating signal for controlling the circuit arrangement in the event of a short-circuit to measure the distance of the fault location.

2. A circuit arrangement as claimed in claim 1 wherein the first analog measuring data transmitter is also responsive to the line current and provides as a reactive voltage transmitter a direct voltage (U2) proportional to the reactive voltage.

3. A circuit arrangement as claimed in claim 1, further comprising a circuit arrangement connected to the second analog measuring data transmitter (G2) having two resistors for removing the volatile component from a current (I1) proportional to the line current, a filter network for suppressing the stationary component of the current (I1) proportional to the line current, means for energizing one of the resistors with the current (I1) via the filter network to provide a voltage corresponding to the volatile component at the one of the resistors, and means for energizing the other of the resistors with the current (I1) directly to provide at the other resistor a voltage corresponding to said current, the voltages at the resistors being applied in opposition to provide the stationary component.

4. A circuit arrangment as claimed in claim 1, wherein the digital divider comprises a counter connected to one of the voltage-frequency converters and controlled in synchronism by the other of the voltage-frequency converters.

5. A circuit arrangement as claimed in claim 1, wherein the digital divider comprises a first counter (Z1) connected to the first voltage-frequency converter (SF1) and a second counter (Z2) connected to the second voltage-frequency converter (SF2), the second counter being connected to and controlling the first counter in synchronism.

6. A circuit arrangement as claimed in claim 5, wherein the second counter provides a frequency division.

7. A circuit arrangement as claimed in claim 5, wherein the control system (ST) is connected to the first and second counters and comprises a starting device which delivers a start pulse in response to the initiating signal to cause the counter to register a count upon the occurrence of a short-circuit.

8. A circuit arrangement as claimed in claim 5, wherein the control system (ST) comprises control means connected to the first counter (Z1) for measuring faults and for monitoring deviations of the counter registrations of sequential time periods with regard to whether the deviations lie within a prescribed range, the control system delivering a control signal when deviations of the counter registrations are within the prescribed range.

9. A circuit arrangement as claimed in claim 5, further comprising a digital indicator (A) connected to one of the counters for indicating the counter registration.

10. A circuit arrangement as claimed in claim 5, further comprising a printer (DE) connected to one of the counters for printing the measured distance of the fault location.

11. A circuit arrangement as claimed in claim 5, further comprising a printer (DE) connected to one of the counters and the control system for printing the measured distance of the fault location, the control system releasing the printer for printing.

12. A circuit arrangement as claimed in claim 8, further comprising a protective device for the line connected to the control system (ST), the control signal delivered by the control system quenching a blocking signal for the release command of the protective device if the control signal appears within a predetermined time interval after the initiating signal.

13. A circuit arrangement as claimed in claim 12, wherein the blocking signal is quenched at the latest after the expiration of the predetermined time interval.

14. A circuit arrangement as claimed in claim 12, wherein the control system (ST) includes means for providing a stop pulse for the counters (Z1, Z2) after the expiration of the predetermined time interval after the blocking signal is quenched for obtaining the counter registration.

15. A circuit arrangement as claimed in claim 12, further comprising an operating switch for reversing the control system so that the protective device is effective in one position independently of the measurement of the distance of the fault location and in another position dependent upon the measurement of the distance of the fault location.

16. A circuit arrangement as claimed in claim 12, further comprising a distance protection accessory (DZ) connected to one of the counters and including for each resistance stage a plurality of digital control elements corresponding to the number of registrations of the counter, timing means, a release command transmitter and connecting means comprising logic elements.

17. A circuit arrangement as claimed in claim 16, wherein the distance protection accessory includes two comparison resistors, a logic circuit, means for producing two auxiliary voltages at the two comparison resistors in accordance with the phases of the voltages for providing a square release area, and means for providing a difference voltage from one of the auxiliary voltages and a measuring voltage and from the two auxiliary voltages and applying the difference voltages to the logic circuit, the logic circuit producing a quenching signal when the difference voltages have zero passages with specific positive and negative signs during a time interval determined by the zero passages of the auxiliary voltages.

* * * * *